United States Patent

Ferber et al.

[15] 3,666,950

[45] May 30, 1972

[54] INTEGRAL MULTI-SENSOR RADIATION DETECTOR

[72] Inventors: Robert R. Ferber, Pittsburgh, Pa.; George A. Gilmour, Severna Park, Md.

[73] Assignee: Westinghouse Electric Corporation, Pittsburgh, Pa.

[22] Filed: Sept. 30, 1969

[21] Appl. No.: 862,428

[52] U.S. Cl. ..........................250/83.1, 250/83.6 R, 313/61, 313/93
[51] Int. Cl. ..........................................G01t 1/18, G01t 3/00
[58] Field of Search..................250/83.1, 83.6 R; 313/93, 61

[56] References Cited

UNITED STATES PATENTS

| | | | |
|---|---|---|---|
| 2,122,222 | 6/1938 | Vingerhoets | 313/93 X |
| 2,741,709 | 4/1956 | Tirico et al. | 313/93 X |
| 2,944,150 | 7/1960 | Replogle, Jr. et al. | 313/61 X |
| 2,962,614 | 11/1960 | Weill | 313/61 |
| 2,967,244 | 1/1961 | Dewan et al. | 313/93 X |
| 3,110,835 | 11/1963 | Richter et al. | 313/93 |
| 3,381,131 | 4/1968 | Meal et al. | 313/61 X |

*Primary Examiner*—Archie R. Borchelt
*Attorney*—F. H. Henson, C. F. Renz and M. P. Lynch

[57] ABSTRACT

The invention is a radiation detector assembly comprising multiple independent radiation sensors positioned within a common gas enclosure and operated at substantially equal voltage.

11 Claims, 3 Drawing Figures

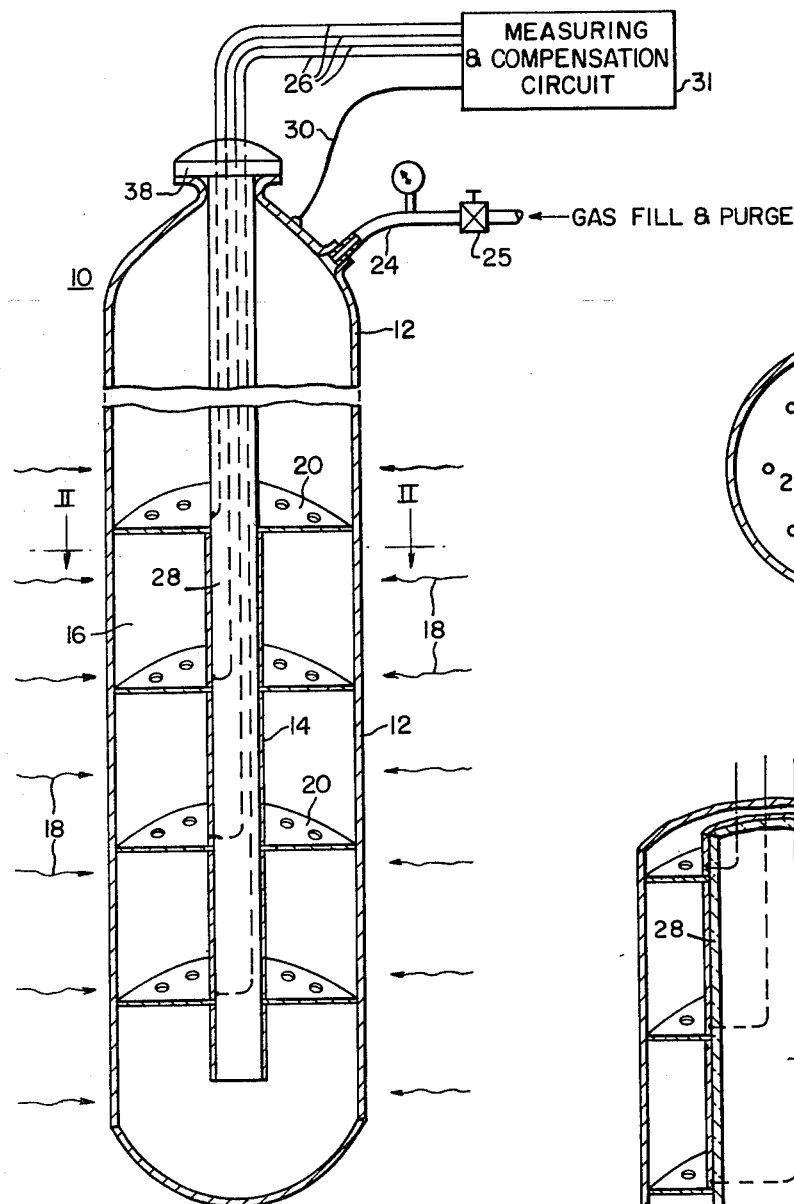
FIG.1.
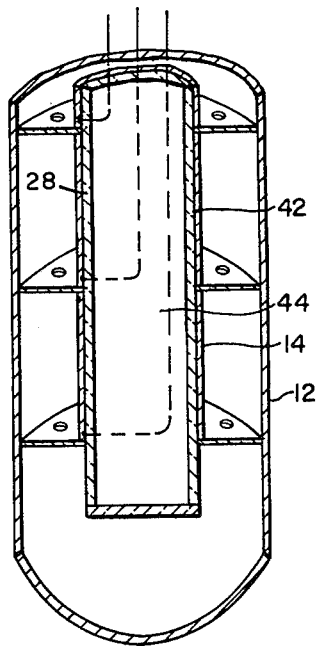
FIG.2.
FIG.3.
WITNESSES
Theodore F. Wrobel
James F. Young
INVENTORS
Robert R. Ferber and
George A. Gilmour
BY Michael P. Lynch
ATTORNEY

INTEGRAL MULTI-SENSOR RADIATION DETECTOR

BACKGROUND OF THE INVENTION

1. Field of the Invention

The invention relates to a radiation detector and more particularly to a multiple sensor radiation detector assembly for use as an in-core detector for monitoring the neutron and gamma radiation levels within a nuclear reactor.

2. Description of the Prior Art

The power reactor industry has requirements for a neutron detector system which may be installed in-core at the time of core assembly and which will operate for the useful life of the core. This requires an operational capability to neutron fluxes in order of $10^{21}$ n/cm$^2$.

The neutron detector types presently available consist of ion chambers, fission counters and self-powered detectors of both the prompt and slow response types.

Present ion and fission chamber designs fail at one-third or less of the required life. Available experimental evidence indicates several modes of failure. The majority of ion chamber failures due to radiation damage can be attributed to either cable failure at the normal operating bias voltages (150-200 volts) or seal failure resulting in loss or contamination of the chamber fill gas.

The slow response self-powered detectors in addition to being susceptible to radiation damage are unacceptable due to slow response and poor sensitivity.

The prompt self-powered detectors have been unsuccessful due to sensitivity to spurious electrical signals which render the output unreliable.

SUMMARY

The inventions embodies a new concept in D.C. ion chamber or pulse fission chamber neutron or gamma detector design.

The invention comprises an integral multi-sensor radiation detector assembly which can be made as long as desired to span a nuclear reactor core or region of interest.

The detector assembly includes an outer enclosure tube into which is assembled multiple ion chamber sections with the enclosure tube serving as a common cathode for all ion chamber sections. The chamber anodes are tubular members of smaller diameter than the enclosure tube and are aligned end to end, concentric within the enclosure tube. A tubular ceramic rod provides support for the anodes and electrical insulation for electrical cables operatively associated with the anodes. A common fill gas environment is provided within the cathode enclosure.

Therefore since all chambers are located within the same gas-filled enclosure and exhibit similar mechanical structure, the chambers exhibit substantially identical electrical characteristics and can be operated at the same applied potential.

The utilization of identical anode potentials minimizes the potential difference between the anode cables and the surrounding anode structures thereby reducing detector failure due to cable deterioration.

An optional tubular passage within the aligned anode elements permits the insertion of a miniature calibration detector or radiation source for calibration of each sensor individually.

Furthermore the utilization of separate sensors within a common enclosure permits the fabrication of a detector assembly which exhibits substantial mechanical flexibility. This flexibility permits the insertion of the detector assembly through curved passages.

DESCRIPTION OF THE DRAWING

FIG. 1 is a sectional illustration of a typical embodiment of the invention;

FIG. 2 is a sectional view along lines II—II of FIG. 1; and

FIG. 3 is an alternate embodiment of the invention.

DESCRIPTION OF THE PREFERRED EMBODIMENT

Referring to FIGS. 1 and 2 there is illustrated a common enclosure, multi-sensor radiation detector 10 of a type commonly referred to as an ionization chamber. Radiation detector 10 comprises basically a common tubular cathode electrode 12 which forms the enclosure of the detector 10, and a plurality of anode electrode elements 14, each defining a separate radiation detector ionization chamber. An ionizable environment is established within the enclosure formed by the cathode 12. This environment is typically illustrated as gas filled environment 16. A suitable voltage source (not shown) establishes a high potential difference between the cathode and the anodes 14. When the detector 10 is exposed to nuclear radiation 18 the gas 16 is ionized and each ion is drawn to the electrode of opposite polarity. The resulting current flow as measured by an electronic circuit (not shown) is proportional to the intensity of the radiation.

The detector cathode electrode 12 is a closed-end tubular member and the anode electrode elements 14 are illustrated as tubular members of smaller diameter than the cathode element 12. Typical electrode materials include stainless steel, inconel, etc. The anode elements are aligned in an end-to-end, spaced apart relationship concentric about the axis of the cathode element 12.

The use of a continuous ceramic tube 28 permits the elimination of separate metallic tube members for the ion chamber anode elements 14. The anodes 14 may be plated or vacuum deposited as thin coatings applied directly to the outer surface of the ceramic tube 28.

The electrical cables 26 which are associated with each anode element and function as anode electrical leads are directed through isolated passages in the ceramic tube 28 to provide individual cable insulation from adjacent cables as well as insulation from the anode elements. The spacing of the anodes provides the desired electrical isolation between each anode as well as providing a location for positioned ceramic insulating members 20. Ceramic insulating members 20, designed to present longest possible leakage path consistent with mechanical strength, maintain the position of the anode element 14 relative to the cathode 12. Passages 22 are provided in each insulating member 20 to permit the free flow of the fill gas 16 which is applied to the enclosure through the gas fill line 24.

The anode electrical cables 26 exit the detector 10 through a sealed interconnect member 38 which is positioned outside the principal radiation field. The cathode cable connection 30 is made to the external surface of the tubular cathode element 12. The anode cables 26 and cathode cable are connected to a measuring and compensation circuit 31.

Each anode element in combination with the cathode element 12 forms an independent ion chamber radiation sensor, the electrical response of which represents the intensity of a portion of the nuclear radiation 18. The number, type, or arrangement of radiation sensors secured within the cathode enclosure 12 may be varied to suit the application.

The radiation sensors applicable include fast neutron, slow neutron and gamma sensitive sensors.

In the event a neutron sensitive anode element is positioned adjacent to a gamma sensitive element, gamma sensitivity compensation for the neutron sensitive anode element can be accomplished electrically in the measuring and compensation circuit 31 by comparing the electrical outputs of the adjacent ionization chambers.

Furthermore the concentric end-to-end arrangement of the sensing anode elements 14 within the cathode element 12 permits the fabrication of a relatively flexible detector probe capable of being formed for insertion in curved passageways. The ceramic components of the detector assembly permit bending of the assembly in a radius between 5–10 feet.

The common gas environment in which the individual radiation sensors are operated coupled with the substantially identical mechanical configuration of each anode element permits the utilization of a common excitation potential for each of the sensors. Long life operation of the individual detector sensors is greatly enhanced by the isolation of the anode electrical cables 26 from the high potential electric field between the cathode 12 and the anodes 14. As noted previously cable failure resulting from cable insulation breakdown represents a significant factor in sensor failure. Inasmuch as the potential difference between the signal present on the cables 26 and the potential of each of the anode elements 14 is negligible, a prime source of radiation sensor failure, i.e., cable failure, is substantially eliminated. Sensor failure attributed to loss of effective sealing of interconnect 28 can be eliminated by providing a cathode enclosure 12 of sufficient length so as to remove the interconnect 28 from the high radiation field.

The sensitivity of the radiation sensors can be controlled by varying the pressure of the gas within the cathode enclosure 12. The location of the gas fill inlet tube 24 remote from the high radiation environment provides the capability of either adjusting the pressure of the fill gas by a control device 25 during detector operation or purging and refilling the detector enclosure in the event the fill gas becomes contaminated. The capability of replacing fill gas during detector operation minimizes detector failure due to contaimination of the fill gas.

A partial sectioned view of an alternate embodiment of the detector 10 of FIGS. 1 and 2 incorporating a cylindrical ceramic anode support tube 42 is illustrated in FIG. 3. The cylindrical construction of the ceramic support tube 42 of FIG. 3 provides access to the region of each of the radiation sensors for the purpose of calibrating each sensor. A miniature calibration detector or radiation source (not shown) can be inserted through a central passage 44 in the support tube 42 and positioned within each anode element for calibrating the sensor formed by the cathode 12 and the respective anode elements 14.

Again, the utilization of the ceramic support member 42 as a conduit for the anode cables minimizes detector failure which occurs when the cable insulation is subjected to a high potential difference within the radiation field.

While the specific embodiments described utilize a common cathode and a plurality of anode elements, it is apparent that the novel structural and operational features disclosed apply also to a detector incorporating a common anode and a plurality of cathode elements.

Various modifications may be made within the scope of this invention.

What is claimed is:

1. A multi-sensor radiation detector assembly, comprising, a closed end tubular first electrode forming an enclosure, an hermetically sealed interconnect member located in the enclosure end opposite to said closed end, a plurality of slightly spaced apart substantially identical tubular second electrodes positioned coaxially and concentrically in end to end relationship within the enclosure formed by said first electrode, electrical conductor means including a plurality of individual electrical conductors operatively connected to each of said tubular second electrodes and extending within said second electrodes through said interconnect member, and an electrical conductor operatively connected to said first electrode, means for providing an ionizable environment between said first electrode and said second electrodes, each of said second electrodes forming a separate ionization chamber with said first electrode, and a voltage source generating a voltage of a predetermined magnitude, said voltage source being operatively associated with said electrical conductor means to apply substantially the same voltage potential difference across the electrodes of said respective ionization chambers.

2. A multi-sensor radiation detector assembly as claimed in claim 1 including means for adjustably controlling the pressure of the ionizable environment within said first electrode enclosure to control the sensitivity of the respective ionization chambers.

3. A multi-sensor radiation detector assembly as claimed in claim 2 wherein said ionizable environment is comprised of an ionizable fill gas.

4. A multi-sensor radiation detector assembly as claimed in claim 1 including means for purging the ionizable environment within said first electrode enclosure and refilling said enclosure.

5. A multi-sensor radiation detector assembly as claimed in claim 10 wherein said elongated insulator member includes a longitudinal passage to provide internal access to the second electrodes of the respective ionization chambers for the purpose of calibrating each ionization chamber.

6. A multi-sensor radiation detector assembly as claimed in claim 1 wherein said first electrode is a cathode electrode and said second electrodes are anode electrodes.

7. A multi-sensor radiation detector assembly as claimed in claim 1 wherein said first electrode is an anode electrode and said second electrodes are cathode electrodes.

8. A multi-sensor radiation detector assembly as claimed in claim 1 wherein the ionization chambers formed by said first and second electrodes include neutron sensitive and gamma sensitive ionization chambers in any desired order.

9. A multi-sensor radiation detector assembly as claimed in claim 8 including means for providing gamma sensitivity compensation for neutron sensitive ionization chambers.

10. In a multi-sensor radiation detector assembly as claimed in claim 1 including an elongated insulator member extending through said tubular second electrodes to support said tubular second electrodes and to maintain said tubular second electrodes in a spaced apart relationship, said elongated insulator member having longitudinal passages therein to accommodate said plurality of individual electrical conductors operatively connected to said tubular second electrodes.

11. A multi-sensor radiation detector as claimed in claim 10 including a plurality of insulating disc members each having apertures therein and being positioned between said tubular second electrodes and extending radially between and in abutting contact with said elongated insulator member and said first electrode.

* * * * *